(12) United States Patent  
Le

(10) Patent No.: US 6,205,128 B1  
(45) Date of Patent: Mar. 20, 2001

(54) ENHANCED HANDOFF SIGNALING FOR HIGH SPEED DATA AND MULTIMEDIA

(75) Inventor: Khiem Le, Coppell, TX (US)

(73) Assignee: Nokia Telecommunications, Oy, Espoo (FI)

( * ) Notice: Subject to any disclaimer, the term of this patent is extended or adjusted under 35 U.S.C. 154(b) by 0 days.

(21) Appl. No.: 09/004,086

(22) Filed: Jan. 7, 1998

(51) Int. Cl.[7] .................................................. H04Q 7/00
(52) U.S. Cl. ........................ 370/331; 370/348; 370/400; 455/439
(58) Field of Search .................................. 455/422, 436, 455/438, 439; 370/328, 331, 336, 335, 348, 349, 400, 338; 379/57, 88.15

(56) References Cited

U.S. PATENT DOCUMENTS

| | | | |
|---|---|---|---|
| 5,608,780 | * | 3/1997 | Gersberg et al. .................. 455/436 |
| 5,794,149 | * | 8/1998 | Hoo ..................................... 455/438 |
| 5,796,727 | * | 8/1998 | Harrison et al. ..................... 370/338 |
| 5,857,153 | * | 1/1999 | Lupien ................................. 455/422 |
| 6,014,429 | * | 1/2000 | Laporta et al. ................... 379/88.15 |

FOREIGN PATENT DOCUMENTS

WO 96/10320   4/1996   (WO).
WO 97/23110   6/1997   (WO).

\* cited by examiner

*Primary Examiner*—Hassan Kizou
*Assistant Examiner*—John Pezzlo
(74) *Attorney, Agent, or Firm*—Altera Law Group, LLC

(57) ABSTRACT

An enhanced handoff signaling method is disclosed that provides a short negotiation time by avoiding the need to downgrade and upgrade, provides greater efficiency by preventing calls from being dropped due to unsuccessful negotiation after the mobile station has moved to the target system, and minimizes the signaling load on the spectrum during handoff negotiations. The method includes the steps of negotiating air interface attributes that the target system can grant, sending a single message to the mobile station to order the mobile station to execute a handoff and to convey granted air interface attributes to the mobile station and executing a handoff of the mobile station to channels on the target system in accordance with the granted air interface attributes. Accordingly, a channel is not dropped even when the target system supports air interface attributes different from the source system. Further, the negotiating is performed solely over wireline links between the source system and the target system, and no negotiation involving the mobile station is required.

15 Claims, 8 Drawing Sheets

FIG. 4

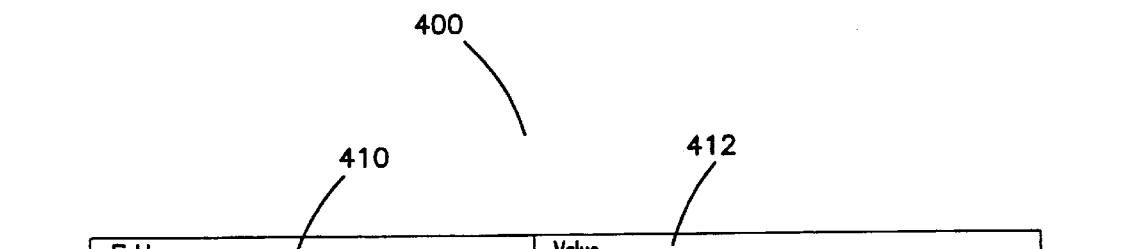

| Field | Value |
|---|---|
| First service connection (for video) | |
| Duplex symmetry | Symmetric |
| User bit rate forward and reverse links | Acceptable values: 64 kb/sec or 128 kb/sec; 128 kb/sec is preferred |
| Tolerable bit error rate | $1 \times 10^{-3}$ |
| Delay | Bulk delay: Max 200ms |
| Second service connection (for Web browsing) | |
| Duplex symmetry | Asymmetric |
| User bit rate forward link | Min acceptable: 38.4 kb/sec<br>Max: 500 kb/sec; a higher rate is preferred |
| User bit rate reverse link | Min acceptable: 9.6 kb/sec<br>Max: 28.8 kb/sec |
| Tolerable bit error rate | $1 \times 10^{-6}$ |
| Delay | Unconstrained |

FIG. 5

| Field | Value | |
|---|---|---|
| 520 — Max number of service connections | 4 | 522 |
| 530 — Max number of traffic channels overall | 16 (can be any combination of type 1 or type 2 traffic channels | 532 |
| 540 — Max number of traffic channels per service connection (in each direction) | 16 | 542 |
| 550 — Attributes for a type 1 traffic channel | Transmission rate 9.6 kb/sec, can work in one of 2 modes:<br>- "Packet" mode: 1x10-6 error rate, unconstrained delay, with medium access control (MAC) and variable throughput<br>- "Circuit" mode: 1x10-3 error rate, max delay 80 ms, constant throughput | 552 |
| 560 — Attributes for a type 2 traffic channel | Transmission rate 14.4 kb/sec, can work in one of 2 modes:<br>- "Packet" mode: 1x10-6 error rate, unconstrained delay, with medium access control (MAC) and variable throughput<br>- "Circuit" mode: 1x10-3 error rate, max delay 80 ms, constant throughput | 562 |

FIG. 6

| Field | Value | |
|---|---|---|
| 602 — First service connection (video) | | |
| 620 — Number of traffic channels in each direction | 5 channels of type 2 (Available rate is 5 x 14.4 kb/sec = 72 kb/sec | 622 |
| 630 — Mode for a traffic channel (in both directions) | Circuit | 632 |
| 604 — Second service connection (Web browsing) | | |
| 640 — Number of traffic channels on forward link | 3 channels of type 2 | 642 |
| 650 — Number of traffic channels on reverse link | 1 channel of type 2 | 652 |
| 660 — Mode for a traffic channel (in both directions) | Packet. MAC priority class assigned: Medium. | 666 |

FIG. 7

| Field | Value |
|---|---|
| Number of type 1 traffic channels in circuit mode currently available | 15 |
| Number of type 2 traffic channels in circuit mode currently available | 20 |
| Number of type 2 traffic channels in packet mode currently available | 12 |
| Priority classes available in type 2 packet mode | Low<br>Priority classes high and medium are full, i.e. no new user can be admitted for the time being |

ENHANCED HANDOFF SIGNALING FOR HIGH SPEED DATA AND MULTIMEDIA

BACKGROUND OF THE INVENTION

1. Field of the Invention

This invention relates in general to communication systems, and more particularly to an enhanced handoff signaling for high speed data and multimedia.

2. Description of Related Art

Cellular communication systems, operate on various air interface standards. For example, there is the first generation Analog Mobile Phone Systems (AMPS) whose air interface is described in detail in EIA/TIA (Electronics Industry Association/Telecommunications Industry Association) IS-553. Second generation standards include the U.S. Time Division Multiple Access (TDMA) standard, IS-54/IS-136, GSM (Global System for Mobile communications), and a Code Division Multiple Access (CDMA) standard, IS-95. In addition, there are standards for wireless local area networks that specify the air interface between stations and between stations and access points.

A major driver for the evolution to third generation cellular communication systems is the provision of high speed data and multimedia services. This implies that wireless networks must provide high speed packet-based and circuit-based transport and bandwidth-upon-demand, as well as support multimedia applications. Since the radio spectrum is limited, future wireless systems will have micro/picocellular architectures in order to provide the higher capacity needed to support high speed data services. Due to the small coverage area of micro/picocells and characteristics of the multipath and shadow fading radio environment, hand-off events in future microcellular systems will occur at a much higher rate as compared to today's macrocellular systems, and control of such systems will introduce a new set of challenges including handling the increased load on the wireless spectrum during handoff negotiations.

Wireless/mobile connections may be viewed as consisting of paths (or routes) through the backbone network; and radio links between the mobile, wireless terminals and base stations (or access points) which connect mobile users to the fixed backbone network through mobile switching centers (MSC), or functionally equivalent entities. In what follows, "wireless network" refers to the base stations and MSCs, or functionally equivalent entities.

When the quality of a radio link between a wireless terminal and its base station degrades, a new base station with acceptable quality must be found (hand-off), and network control functions need to be invoked in the wireless network, and possibly in the fixed network. Hand-off requires the establishment of a new route, which transports the user data destined to (or originated from) the wireless terminal to (or from) the new base station. Here, network call processing functions need to be invoked in order to set up such a route and ensure that the newly established route maintains acceptable quality-of-service (QOS) to both the wireless connection and to pre-existing calls sharing links of the new route. Furthermore, to execute hand-off, one must first ensure that the new wireless connection does not overload the new system and then create a radio link between the mobile terminal and the new base station. As one can see, a substantial number of call processing and control functions of the fixed and wireless network must be invoked to complete a hand-off event.

High speed data services require more complex service and air interface attributes than speech or lower speed data services. Service attributes are relevant to the calling party and called party's applications and are independent of air interface attributes. Examples of service attributes are an indication whether the bit rates are the same in both directions (symmetric) or not (asymmetric), the bit rate range, acceptable residual error rate, acceptable delay, etc. Air interface attributes are relevant only to the air interface. For example, in IS95, these attributes specify characteristics such as the multiplex option, rate set, etc. In essence air interface attributes provide the information required for building and interpreting traffic channel frames. With the advent of third generation systems, it is quite possible that there will be various types of base stations, i.e., base stations that support different sets of air interface attributes.

For convenience and conciseness, the collection of service attributes pertaining to a call are referred to as the Application Service Configuration (ASC). Herein below, ASC will be used interchangeably with service attributes. Note that the term "call" is used here in the broadest sense, and may include a multimedia conference or packet data session. The air interface attributes are referred to as High Speed Data Service Configuration (HSDSC). Herein below, HSDSC will be used interchangeably with air interface attributes. If a system does not have the required resources, the HSDSC may only meet the minimum requirements of the ASC, not the preferred ones. Examples of ASC and HSDSC will be discussed below. In what follows, in the most general case, "system" refers to a base station and the associated MSC.

Handoff between systems cannot be carried out unless a service negotiation take place so the target system and mobile terminal can agree on HSDSC that are compatible with their respective capabilities and also meet the service requirements, as indicated by the ASC. Service negotiation has to be efficient to minimize duration of service disruption caused by handoff, and minimize signaling load on spectrum resources.

One approach is to downgrade the radio channels to a default lower speed, carry out the handoff using the existing second generation handoff signaling procedure (for lower speed data), and perform service negotiation once the mobile is on the target system. After negotiation is completed, the air interface may be upgraded to the agreed upon higher bandwidth. The drawbacks of the method are a longer negotiation time, caused by the additional steps to downgrade and upgrade, and lower efficiency, caused by the possibility of the call being dropped due to unsuccessful negotiation after handoff is performed. Also, there is a heavier signaling load on the wireless link, where bandwidth is at a premium.

It can be seen that there is a need for an enhanced handoff signaling method that provides a short negotiation time by avoiding the need to downgrade and upgrade.

It can also be seen that there is a need for an enhanced handoff signaling method that provides greater efficiency by preventing calls from being dropped due to unsuccessful negotiation after the mobile station (MS) has moved to the target system.

It can also be seen that there is a need for an enhanced handoff signaling method that minimizes the signaling load on the wireless spectrum during handoff negotiations.

It can also be seen that there is a need for a target system to be capable of granting air interface attributes that more closely match the preferred service attributes, when the target system has the resources to do so, and when the air interface attributes currently in effect on the source system happens to not match the preferred service attributes.

It can also be seen that there is a need for an enhanced handoff signaling method that gives the option to switch to a new HSDSC, provided the new HSDSC is compatible with the mobile terminal's capabilities and meets the service requirements.

SUMMARY OF THE INVENTION

To overcome the limitations in the prior art described above, and to overcome other limitations that will become apparent upon reading and understanding the present specification, the present invention discloses an enhanced handoff signaling method.

The present invention solves the above-described problems by providing an enhanced handoff signaling method that provides a short negotiation time by avoiding the need to downgrade and upgrade, provides greater efficiency by preventing calls from being dropped due to unsuccessful negotiation after the mobile station has moved to the target system, minimizes the signaling load on the radio spectrum during handoff negotiations, and provides the option to switch to new HSDSC at the target system, when the HSDSC currently in use is not available at the target system.

A method in accordance with the principles of the present invention includes the steps of negotiating air interface attributes that the target system can grant, sending a single message to the mobile station to order the mobile station to execute a handoff and to convey granted air interface attributes to the mobile station, and executing a handoff of the mobile station to channels on the target system in accordance with the granted air interface attributes.

Other embodiments of a method in accordance with the principles of the invention may include alternative, additional or optional additional aspects. One such aspect of the present invention is that the step of negotiating air interface attributes includes the step of sending the target system a single signaling message.

Another aspect of the present invention is that the step of sending the target system a single signaling message includes the step of advertising ASC and capabilities of the mobile station.

Another aspect of the present invention is that the step of negotiating further includes the steps of determining whether the target system can grant an HSDSC that satisfies the ASC and that is compatible with the capabilities of the mobile station, returning a signaling message to the source system representing the HSDSC granted by the target system in response to a positive identification of air interface attributes that satisfy the service attributes and that are compatible with the capabilities of the mobile station, sending a message from the source system to the mobile station to convey the granted air interface attributes, and executing the handoff of the mobile station to the target system in accordance with the granted air interface attributes.

Another aspect of the present invention is that the method further includes the step of returning a signaling message to the source system from the target system indicating rejection in response to a negative identification of air interface attributes that satisfy the service attributes and that are compatible with the capabilities of the mobile station.

Yet another aspect of the present invention is that the step of sending the target system a single signaling message includes the step of indicating to the target system air interface attributes that cause service disruption when granted by the target system.

Another aspect of the present invention is that the target system can choose a preferred air interface attribute that will minimize disruption of service.

Another aspect of the present invention is that the target system may have air interface attributes different from the air interface attributes currently being used at the source system, wherein the air interface attributes at the target system meet the service attributes and are compatible with the mobile station capabilities so that the call is not dropped.

Still another aspect of the present invention is that the target system may grant air interface attributes which result in quality of service that better match the preferred service attributes than those currently provided by the source system.

Another aspect of the present invention is that the single signaling message minimizes the signaling load on the wireless link.

Another aspect of the present invention is that the ASC, HSDSC and MS capabilities are coded in concise form by using option values.

Another aspect of the present invention is that the ASC, HSDSC and MS capabilities are explicitly enumerated.

Another aspect of the present invention is that the signaling messages to determine the air interface attributes granted by the target system are transported over potentially high speed wireline links between the source system and the target system, thereby saving valuable radio spectrum resources while achieving faster response.

Another aspect of the present invention is that the step of sending a single message to convey granted air interface attributes further comprises the step of concisely conveying the granted air interface attributes in the form of a Boolean flag when the granted air interface attributes do not differ from air interface attributes of the source system.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates a table containing the service attributes for real-time video concurrently with web browsing;

FIG. 5 illustrates the MS capabilities;

FIG. 6 illustrates the air interface attributes on the source system before handoff;

FIG. 7 illustrates the capabilities of the target system; and

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an enhanced handoff signaling scheme that has the flexibility to allow handoff between systems with dissimilar air interface attributes, as long as service requirements and compatibilities with the mobile terminal are satisfied.

The enhanced handoff signaling provides an explicit separation of service attributes and air interface attributes. Such a separation makes handoff more flexible by allowing handoff to a target system which has air interface attributes different from the ones of the source system. The only requirement is that the air interface attributes in the target system satisfy the service attributes, and are compatible with the capabilities of the mobile terminal. In addition, if some facilities of the source system remain involved in the call after handoff, the air interface attributes have to be compatible with these facilities as well. An example of such a facility is the InterWorking Function (IWF).

A signaling process is required to determine the appropriate air interface attributes at the target system, based on service attributes, facilities involved at the source system, and mobile terminal's capabilities. In current systems, a handoff between dissimilar systems is not possible, and the call is dropped. In what follows, such a signaling process will be referred to as service negotiation.

Figure 1:
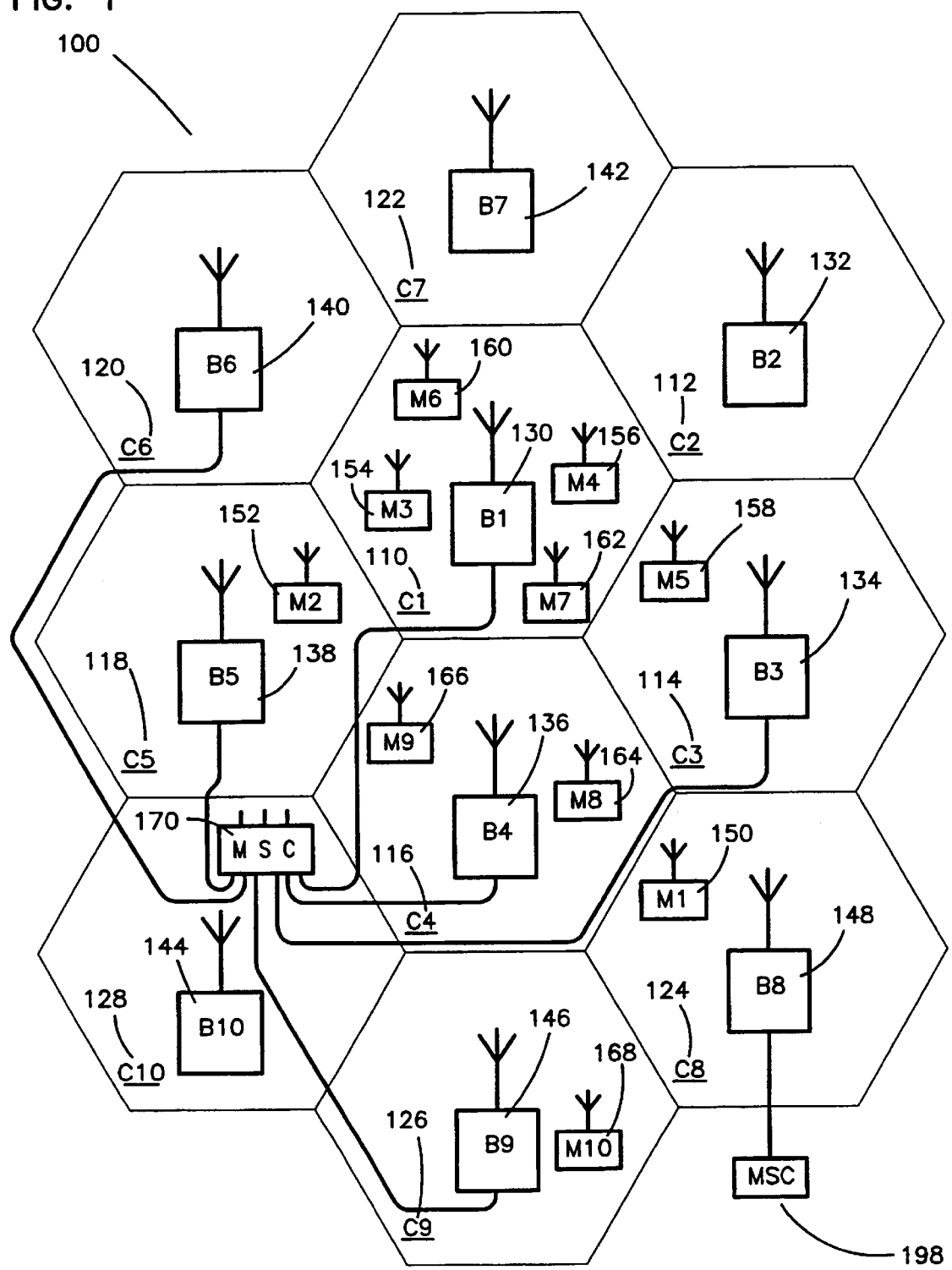
FIG. 1 illustrates a cellular mobile radio telephone system that requires handoffs when the quality of a radio link between a mobile unit and its base station degrades.

FIG. 1 illustrates a cellular mobile radio telephone system 100 that requires handoffs when the quality of a radio link between a mobile unit and its base station degrades. For purposes of description, the system depicted herein includes ten cells. Those skilled in the art will recognize that a cellular mobile radio telephone system may include many more cells, and thus the system depicted herein may be seen as merely an isolated portion of a larger system.

In FIG. 1, for each cell C1 110 to C10 128, there is a base station B1 130 to B10 148. Base stations 130–148 are situated in the vicinity of the respective cell centers. Ten mobile stations M1 150 to M10 168 are movable within the cells 110–128. Those skilled in the art will recognize that the number of mobile stations 150–168 is presented for illustrations only.

FIG. 1 also illustrates mobile switching centers MSC 170, 198. The mobile switching center 170 is shown connected to nine illustrated base stations 130–146. MSC 198 is connected to base station 148. Those skilled in the art will recognize that the mobile switching centers 170, 198 may be connected to the ten base stations 130–148 by wires or other means, e.g., fixed radio links.

When the quality of a radio link between mobile station M1 150 and base station B8 144 degrades, a new access point or base station with acceptable quality must be found, i.e., a handoff must be executed. In FIG. 1, the hand-off requires the establishment of anew route, e.g. from M1 150 to B4 136 rather than form M1 150 to B8 148. After the handoff, the information is transported to (or from) the mobile station M1 150 from (or to) the new access point, B4 136.

When a handoff is to be executed, network call processing functions need to be invoked in order to set up such a route and ensure that the newly established route maintains acceptable quality-of-service (QOS) to both the mobile station M1 150 and to pre-existing calls sharing links of the new route. Furthermore, to execute hand-off, the two mobile switching centers involved 170, 198 must first ensure that the new wireless connection does not overload the new base station B4 136 before the a radio link between the mobile station M1 150 and the new base station B4 136 is created. As one can see, a substantial number of call processing and control functions of the fixed and wireless network must be invoked to complete a hand-off event.

However, a handoff may be required between systems with dissimilar air interface attributes. With the present invention, such a handoff is possible, as long as service requirements and compatibilities with the mobile station are satisfied. Nevertheless, the handoff should minimize negotiation times. Finally, the negotiation should minimize the signaling load on the wireless spectrum by using wireline links.

The present invention defines a service negotiation process that is fast and therefore has very little effect on service disruption duration. Further, the method according to the present invention is applicable in general to any standard. Nevertheless, by way of example, the present invention will be described with regard to a system based on the IS-41 signaling protocol.

IS-41 is a standardized mechanism for mobility management, which includes location and tracking within a cellular telephone network. IS-41 defines a hierarchical database structure, consisting of a Home Location Register (HLR) and a Visitor Location Register (VLR). The interaction of mobile switches with the VLR and HLR is defined in IS-41.

Figure 2:
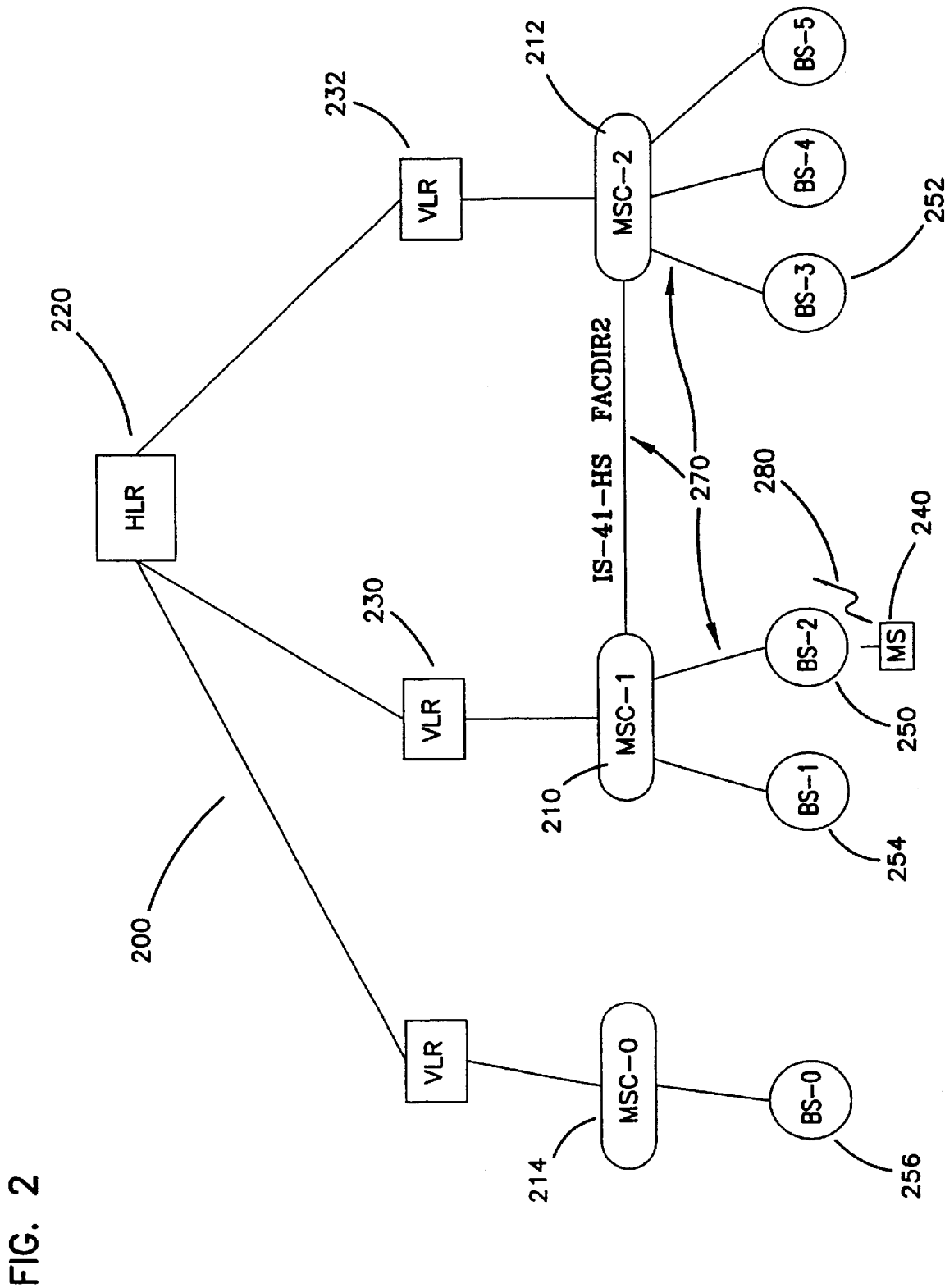
FIG. 2 illustrates the architecture for IS-41-like systems.

FIG. 2 illustrates the architecture 200 for IS-41. Mobile terminal 240, alternatively referred to as cellular subscriber stations or mobile stations, communicate via a channel established through a base station 250. The IS-41 standard is built on top of what is called Signaling System #7. The mobile switching centers (MSC) 210, 212 are the central authority and do most processing. In particular it is responsible for the following:

Coordinates the broadcast of system parameters

Processes registrations

Queries the location registers

Manages paging and selects the nearest base station

Establishes connections and

Coordinates handoff between base stations and MSCs

A location database is divided hierarchically into a Home Location Register (HLR) 220 and a Visitor Location Register (VLR) 230, 232. The IS-41 standard allows a single VLR to support multiple MSCs, so that when a terminal 240 moves it often has to notify only the VLR of the changed MSC. However, in many practical implementations, there is a one-to-one mapping between a MSC 210, 212 and the VLR 230, 232, so that every inter-MSC location update message must propagate back to the HLR 220.

By reference to FIG. 2, the enhanced handoff signaling method according to the present invention may be illustrated. For broadest generality, the case of an inter-MSC handoff is considered. That is, the source and target base stations, BS-2 250 and BS-3 252 in the example, subtend different MSCs, i.e., MSC-1 210 and MSC-2 212 respectively in the example. In FIG. 2, the source system corresponds to the BS-2 250/MSC-1 210 combination, and the target system corresponds to the BS-3 252/MSC-2 212 combination.

Those skilled in the art will recognize that the present invention is equally applicable to the case of handoffs between two base stations subtending a common MSC (intra-MSC handoff). In this case, the source system conceptually corresponds to the source base station 250/common MSC 210 and the target system corresponds to the target base station 254/common MSC 210. Signaling between the source system and the target system becomes internal to the common MSC 210. However, the description below assumes that the source and target base stations subtend different MSCs The service negotiation process for the enhanced handoff signaling is based on two key ideas. The first key idea is to use a source system, i.e., BS-2 250/MSC-1 210 combination, herein referred to as the source system 250/210, for a mobile terminal 240 as a proxy to negotiate with the target system, i.e., BS-3 252/MSC-2 212 combination, herein referred to as target system 250/212, on behalf of the mobile terminal 240. As a result, all of the negotiation signaling takes place on wireline links 270 rather than radio links 280. The benefits are the higher speed of the wireline links 270, and a reduced signaling load on the spectrum. The second key idea is to send all the needed information (ASC and MS capabilities) to the target system 252/212 by the source system 250/210 in one shot. Consequently, no further signaling exchange is required, except for the target system 252/212 to inform the source system 250/210 of the new air interface attributes. The new attributes are conveyed to the mobile terminal 240 along with the order to execute handoff. The mobile terminal 240 executes handoff and immediately tunes in to the new attributes. When mobile station capabilities have passed from the source system 250/210 to the target system 252/212, the information can be used for a subsequent handoff after the handoff is executed.

Figure 3:
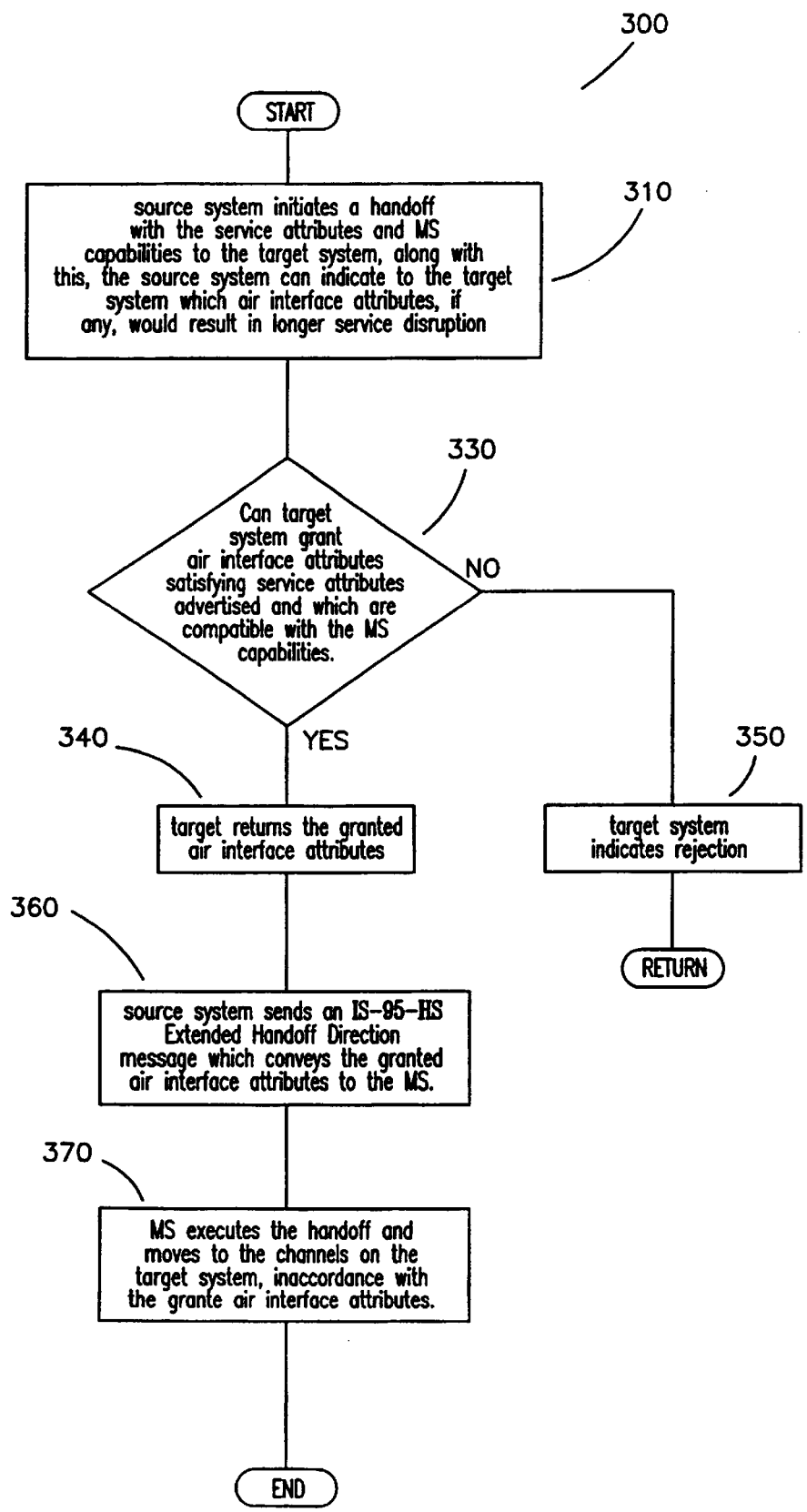
FIG. 3 is a flow chart of the enhanced handoff procedure.

The present invention is applicable to the IS-41 signaling protocol, with the appropriate extensions to support high speed data. The extended messages are denoted IS-41-HS. FIG. 3 is a flow chart 300 of the enhanced handoff procedure.

According to FIG. 3, the source system initiates a handoff by sending an message with the service attributes, e.g., a facilities directive invoke or other signaling message according to IS-41-HS, to the target system, along with the MS (mobile station, mobile terminal or cellular subscriber station) capabilities 310.

The source system 250/210 can determine the MS capabilities in one of two ways. The first way is used when the existing call has already had a handoff from another system, e.g. BS-0 256/MSC-0 214, to the current source system 250/210. In that case, the capabilities of the MS 240 were sent with a facilities directive invoke from BS-0 256/MSC-0 214, which acted as an initial source system, as part of the previous handoff process. The second way is used when the call has never had a handoff. In that case, the source system 250/210 determines the capabilities of the MS 240 from the service subscription profile downloaded from the HLR 220. If the capabilities of the MS 240 cannot be determined from the service subscription profile, e.g., because the subscriber has a Subscriber Identity Module (SIM) which allows it to use different mobile terminals with different capabilities, the source system 250/210 can obtain the information directly from the MS 240, e.g., at call setup time. The information can be sent by the MS 240 spontaneously, or upon query from the source system.

The source system can also provide additional information, e.g., air interface attributes that, if granted by the target system, would result in longer service disruptions. To illustrates the idea of service disruption, an example of Radio Link Protocol (RLP) and InterWorking Function (IWF) will be described.

There may be facilities at the source system, like an IWF, which remain involved in the call after the handoff. The IWF may house an instance of Radio Link Protocol (RLP) that keeps running after handoff is executed. If the target system chooses air interface attributes that are not compatible with the RLP currently in use (i.e., require to close the current RLP and restart a new one of a different type), data loss may occur. To minimize this problem, the source system can also indicate to the target system which air interface attributes, if any, would result in longer service disruption 310. The target system can choose on a preferential basis the air interface attributes that will not require an RLP restart.

The target system then determines if it can grant air interface attributes that satisfy the service attributes, and which are compatible with the MS capabilities 330. If the target system determines that such a grant is possible, the target system returns the granted air interface attributes in a positive response to IS-41-HS FACDIR2, or some variant 340. The target system may be sent a single signal identifying capabilities of the mobile station. If not, the target system indicates rejection in a negative response 350.

After the target system returns the granted air interface attributes, the source system sends an IS-95-HS Extended Handoff Direction message which conveys the granted air interface attributes to the MS 360. The MS then executes the handoff and moves to the channels on the target system, in accordance with the granted air interface attributes 370. The length of the IS-95-HS Extended Handoff Direction message may be minimized by sending a Boolean flag, rather than the granted air interface attributes, if the granted air interface attributes do not differ from the ones of the source system.

The invention will be more specifically described with reference to FIGS. 4–8. The following are simplified examples of service attributes, air interface attributes, MS capabilities.

FIG. 4 illustrates a table 400 containing the service attributes for real-time video 402 concurrently with Web browsing 404. The differing service requirements of real-time video and Web browsing are translated into tow distinct service connections. In FIG. 4, the table includes a field column 410 and a value column 412. The fields 410 for the service attributes are the type of duplex symmetry 420, user bit rates on forward and reverse links 430, tolerable bit error rate 440 and delay 450. The value column 412 indicates that for video 402, the type of duplex symmetry is symmetric 422 (bit rates are the same in both directions), the acceptable bit rate values are 64 kb/sec or 128 kb/sec, with preference for 128 kb/sec 432, the tolerable bit error rate is $1 \times 10^{-3}$ 442, and the maximum bulk delay is 200 ms 452. For Web browsing 404, the value column 412 indicates that the type of duplex symmetry is asymmetric 462 (bit rates are not the same in both directions), bit rate range on the forward link is 38.4 to 500 kb/sec, with preference for higher values in the range 472, bit rate range on the reverse link is 9.6 to 28.8 kb/sec, with no preference 482, the tolerable bit error rate is $1 \times 10^{-6}$ 492, and the delay is unconstrained 496.

FIG. 5 illustrates the MS capabilities 500. Again, the table includes a field column 510 and a value column 512. In FIG. 5, the maximum number of service connections 520 is shown to be 4 522, the maximum number of traffic channels overall 530 is 16 532, the maximum number of traffic channels per service connection (in each direction) 540 is 16 542, the attributes for a type 1 traffic channel 550 includes a transmission rate of 9.6 kb/sec that can work in either packet or circuit mode 552, and the attributes for a type 2 traffic channel 560 includes a transmission rate of 14.4 kb/sec that can work in either packet or circuit mode 562.

FIG. 6 illustrates the air interface attributes 600 on the source system before handoff. The table in FIG. 6 includes a field column 622 and a value column 624. Once a handoff occurs, the source system sends an IS-41-HS FACDIR2 (or some variant) to the target system, along with the service attributes and the MS capabilities.

FIG. 6 illustrates the attributes for real-time video 602 concurrently with Web browsing 604 on the source system. For video 602, the number of traffic channels in each direction 620 is five channels of type 2 622. The mode for a traffic channel 630 is circuit mode 632.

For Web browsing 604, the number of traffic channels on the forward link 640 is three channels of type 2 642, the number of traffic channels on the reverse link 650 is one channel of type 2, and the mode for a traffic channel 660 is packet 662.

MAC priority class is used to prioritize user access to the shared channels in packet mode. Note that due to some reason, e.g., lack of resources, the source system may not grant the preferred service attributes, e.g., if only 64 kb/sec is allocated to the video service connection.

FIG. 7 illustrates the capabilities 700 of the target system. The table in FIG. 7 includes a field column 722 and a value column 724. The target system determines the air interface attributes that satisfy the service attributes and which are compatible with the MS capabilities. The current rate is determined according to the available traffic channels.

The source system has indicated to the target system that the MS capabilities include both type 1 730 and type 2 740 traffic channels, but type 2 is currently being used. So the target system will attempt to grant type 2 channels, to minimize service disruption caused by switching from one type to another. The target system has enough resources available to grant type 2 channels 750. Furthermore, the target system can grant the preferred higher bit rate, i.e., 128 kb/sec, to the video service connection, rather than 64 kb/sec. A higher rate is also allocated to the forward link of the Web browsing service connection. However, the user is downgraded from medium priority to low priority class 760.

Figure 8:
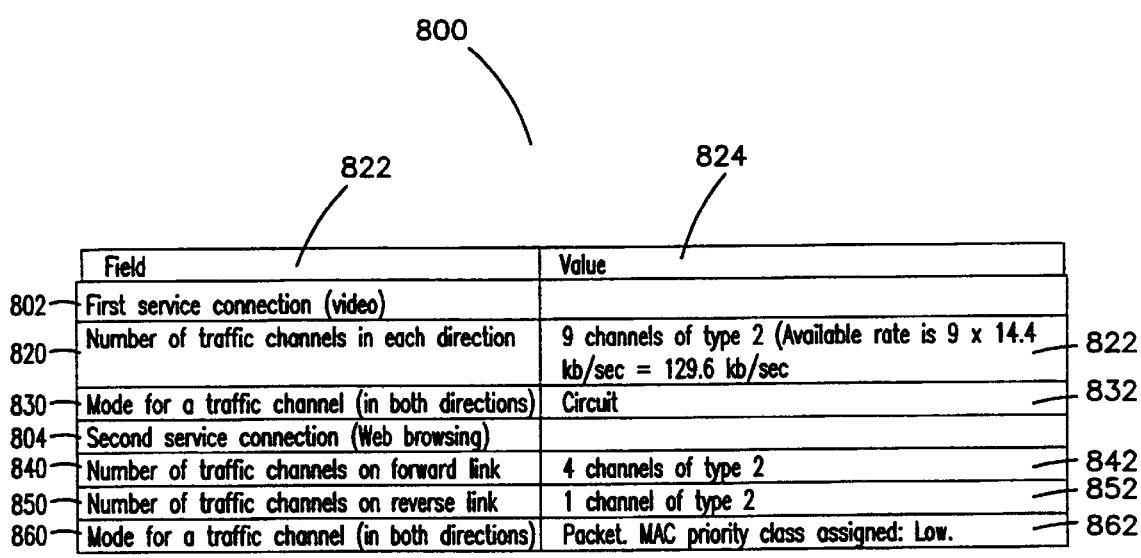
FIG. 8 illustrates the air interface attributes that satisfy the service attributes and which are compatible with the MS capabilities.

FIG. 8 illustrates the air interface attributes granted by the target system. The table in FIG. 8 includes a field column 822 and a value column 824. In FIG. 8, the attributes granted by the target system for real-time video 802 concurrently with Web browsing 804 are shown. For video 802, the number of traffic channels in each direction 820 is nine channels of type 2 822. The mode for a traffic channel 830 is circuit mode 832.

For Web browsing 804, the number of traffic channels on the forward link 840 is four channels of type 2 842, the number of traffic channels on the reverse link 850 is one channel of type 2, and the mode for a traffic channel 860 is packet 862.

As a result of the enhanced handoff scheme, the call is not dropped even when the target system has capabilities different from the source system, and a higher bandwidth is allocated to the user.

Although not shown in the examples, the ASC, HSDSC and MS capabilities can be coded in the form of option values. An option value is a value for which the target and source system have a common understanding. For example, if ASC is coded with an option value, instead of having to send a long list of service attributes, the source system can send only a single value that is translated by the target system into specific service attributes, according to a previously agreed upon understanding with the source system. If the service attributes specify multiple service connections, multiple service options are required, one for each service connection. Options values are most appropriate for commonly used ASC, HSDSC and MS capabilities. The present invention extends the concept of service option in Telecommunication Systems Bulletin 58 to three distinct concepts: air interface attributes, service attributes and MS capabilities, to which the idea of option value can be applied.

In summary, the present invention provides an enhanced handoff signaling scheme that has the flexibility to allow handoff between systems with dissimilar air interface attributes, as long as service requirements and compatibilities with the mobile terminal are satisfied. The time to perform the required service negotiation is kept short by using the source system as a proxy to negotiate with the target system on behalf of the mobile terminal. Most of the signaling takes place on wireline links rather than radio links. The benefits are the higher speed of the wireline links, and a reduced signaling load on the spectrum sending all the needed information to the target system in one shot. Consequently, no further signaling exchange is required, except for the target system to inform the source system of the new air interface attributes. The mobile terminal can then execute the handoff and immediately tune in to the new air interface attributes.

The present invention provides increased flexibility through service negotiation, yet little service disruption caused by service negotiation. Flexibility is increased because handoff between systems with dissimilar capabilities (e.g., with different rate sets and/or multiplex options) is now made possible, as long as the capabilities on the target system meet the service requirements and are compatible with the mobile terminal's capabilities. Service negotiation time is kept short because only one round of signaling messages is exchanged, and the negotiation messages are transported over the high speed wireline signaling channels; another advantage is that no additional signaling load is put on the spectrum. Another benefit of flexibility is the target system can allocate new air interface attributes resulting in a quality of service, e.g., error rate, delay, etc., which better meet the service attributes than before the handoff in the source system.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for executing an enhanced handoff between a source system and a target system of a current call for a mobile station, the source system and the target system possibly having dissimilar air interface attributes, the method comprising the step of:

provising a proxy source system to negotiate with the target system on behalf of the mobile station;

negotiating air interface attributes that the target system can grant, wherein all needed information is sent by the proxy source system to the target system in a single data message;

sending a single message from the proxy source system to the mobile station to order the mobile station to execute a handoff and to convey granted air interface attributes to the mobile station; and executing a handoff of the mobile station to channels on the target system in accordance with the granted air interface attributes.

2. The method of claim 1 wherein the step of sending the target system a single signaling message comprises the step of advertising ASC and capabilities of the mobile station.

3. The method of claim 1 wherein the step of negotiating further comprises the steps of:

advertising to the target system by the source system service attributes of the current call and mobile station capabilities;

determining by the target system whether the target system can grant air interface attributes that satisfy the service attributes and that are compatible with the capabilities of the mobile station; and returning a signaling message to the source system representing air interface attributes granted by the target system in response to a positive identification of air interface attributes that satisfy the service attributes and that are compatible with the capabilities of the mobile station.

4. The method of claim 1 wherein the step of negotiating further includes the step of eliminating signaling between the mobile station and the source system to reduce a signaling load on a wireless link.

5. The method of claim 1 wherein the step of negotiating further includes the step of eliminating signaling between the mobile station and the target system to reduce a signaling load on a wireless link.

6. The method of claim 3 further comprising the step of returning a signaling message to the source system from the target system indicating rejection in response to a negative identification of air interface attributes that satisfy the service attributes and that are compatible with the capabilities of the mobile station.

7. The method of claim 3 wherein the step of advertising includes indicating to the target system air interface attributes that result in service disruption.

8. The method of claim 1 wherein the handoff is permitted even when the target system has air interface attributes different from the air interface attributes of the source system.

9. The method of claim 1 wherein the source system provides a first set of air interface attributes and wherein the granted air interface attributes by the target system result in a quality of service more compatible to the preferred service attributes than the first set of air interface attributes provided by the source system prior to the handoff.

10. The method of claim 1 wherein the granted air interface attributes, service attributes, and MS capabilities are coded in the form of an option value.

11. The method of claim 10 wherein the option value reduces signaling delay by keeping signaling messages short.

12. The method of claim 1 wherein the step of negotiating is performed over wireline links between the source system and the target system.

13. The method of claim 3 further comprises the step of determining the mobile station capabilities once at the beginning of the call from a service subscription profile downloaded from a HLR or from information received directly from the mobile station.

14. The method of claim 13 further comprising the step of passing the mobile station capabilities from the source system to the target system at a subsequent handoff after the handoff is executed.

15. The method of claim 1 wherein the step of sending a single message to convey granted air interface attributes further comprises the step of concisely conveying the granted air interface attributes in the form of a Boolean flag when the granted air interface attributes do not differ from air interface attributes of the source system.

* * * * *